Dec. 25, 1934.  F. W. HORSTKOTTE  1,985,500
SAW MILL
Original Filed April 29, 1931   3 Sheets-Sheet 1
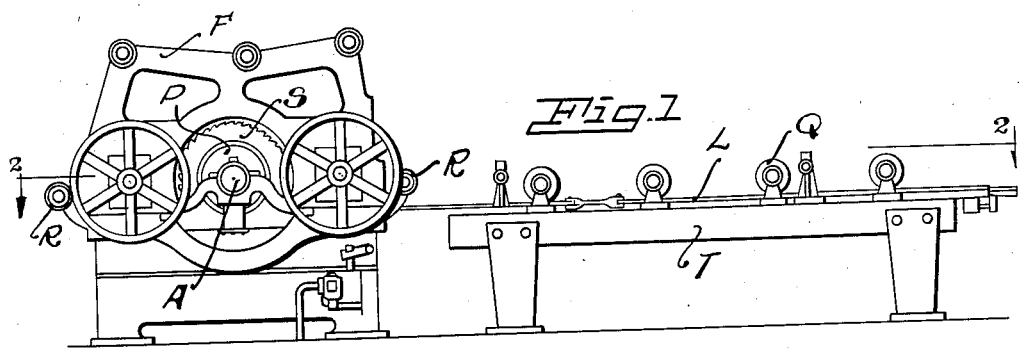
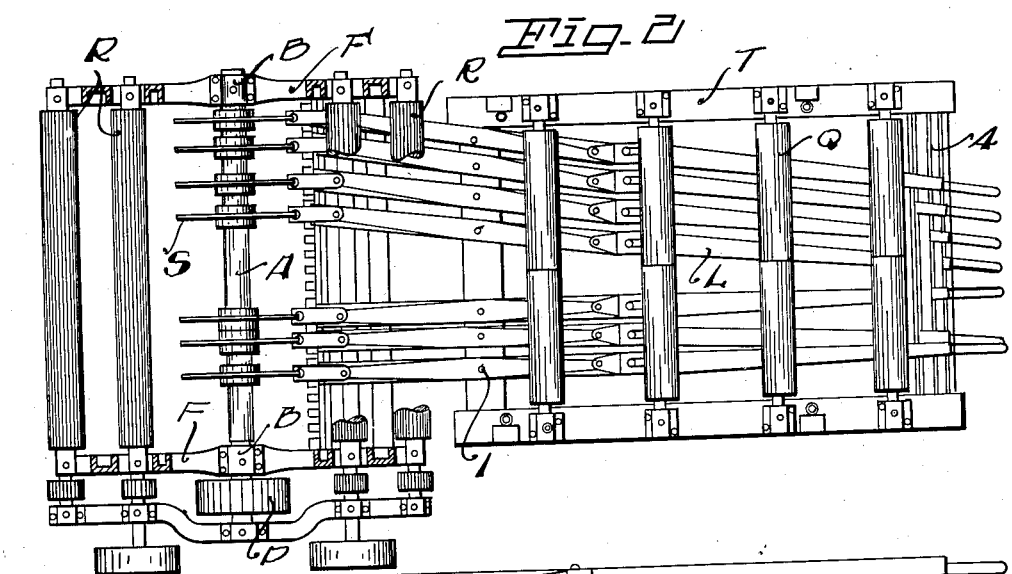
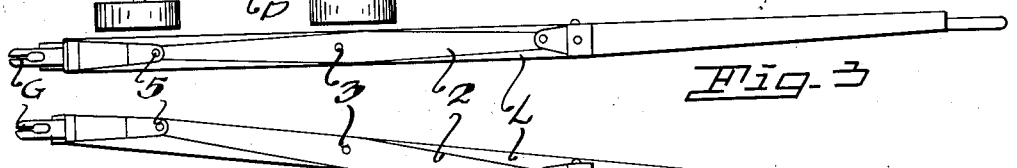
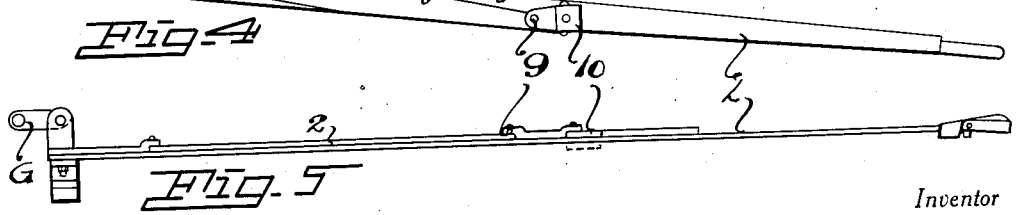
Inventor
FRED W. HORSTKOTTE
By Herbert E. Smith
Attorney

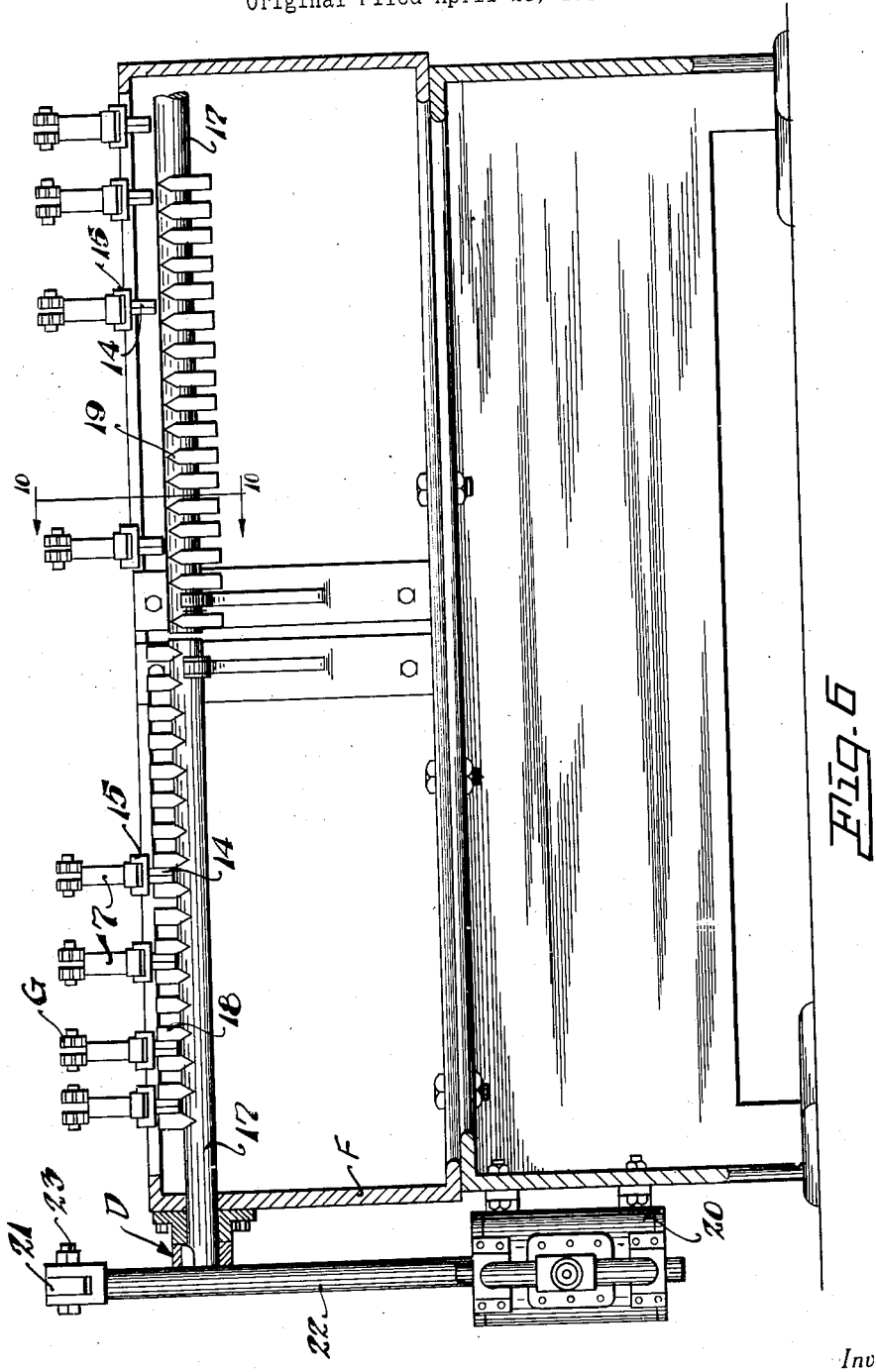

Dec. 25, 1934.   F. W. HORSTKOTTE   1,985,500
SAW MILL
Original Filed April 29, 1931   3 Sheets-Sheet 3
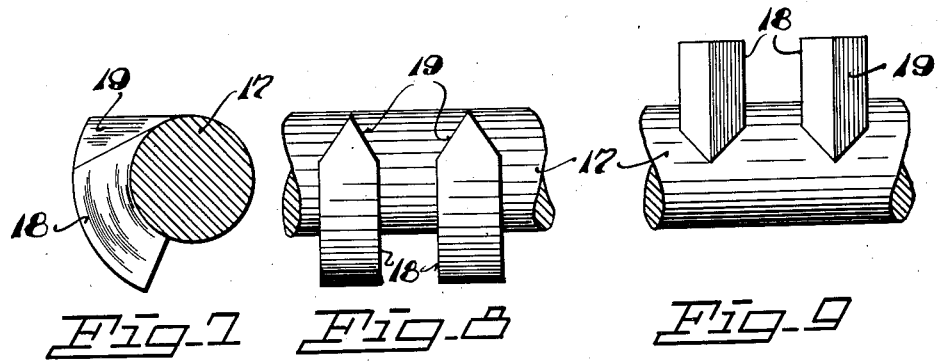
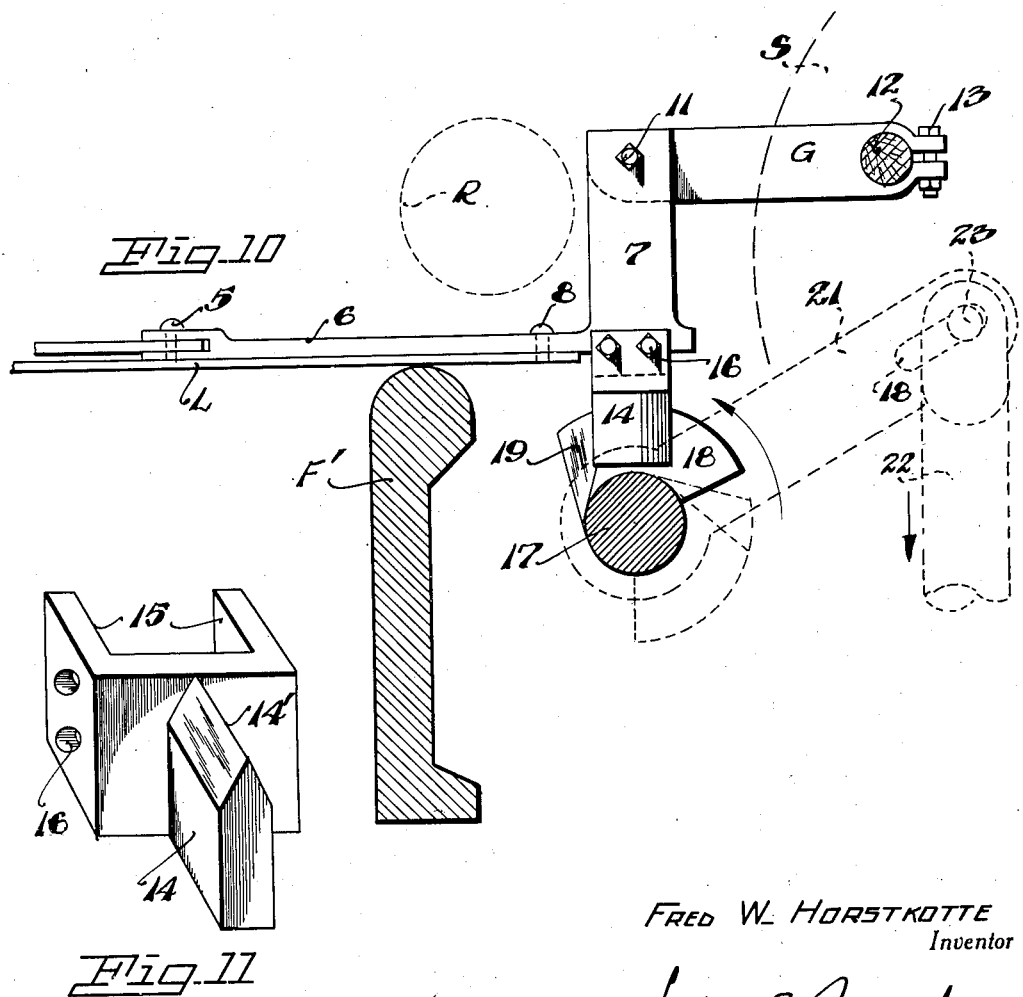
Fred W. Horstkotte
Inventor Patented Dec. 25, 1934

1,985,500

UNITED STATES PATENT OFFICE 1,985,500

SAW MILL

Fred W. Horstkotte, Portland, Oreg.

Original application April 29, 1931, Serial No. 533,625. Patent No. 1,921,569. Divided and this application December 23, 1932, Serial No. 648,684

1 Claim. (Cl. 143—37)

My present invention relates to improvements in saw mills or sawing machines of the edger type employing a gang or set of rotary saws mounted on an arbor, and the invention relates particularly to the means for adjusting to exact position and for locking the saws in their selected and predetermined, adjusted, positions. In sawing machines of the edger type, a gang of rotary saws are mounted on an arbor that extends transversely of the machine, and each saw is provided with a guide that is utilized to shift the saw laterally along the axial or longitudinal line of the arbor. Each saw and its guide is equipped with a pivoted shifting lever on one end of which lever the guide is mounted and the other end of the lever is manipulated by the edgerman, who stands at a comparatively remote distance from the saws. The edgerman shifts the levers to move the saws to approximate positions for cutting the lumber in standard predetermined sizes as the lumber is fed longitudinally through the machine.

For efficiency, accuracy, and durability, as well as reliability in the operation of the saws, it is essential that the saws and their guides shall be positively and rigidly held in adjusted position with relation to the lumber and the board being cut therefrom. To insure these results I have invented a mechanism for automatically and precisely setting or adjusting the saws, and then for automatically locking the saws in adjusted position, this mechanism being under control of the edgerman and his lever, but not actually operated by manipulation of the lever.

In saw mills where the lever is utilized and manipulated as the sole means for the final adjustment of the saws and as the sole means for locking the adjusted saws, the adjustment devices and the locking devices quickly become unreliable due to wear on the parts involving the leverage mechanism, and it will be obvious that if the arm of the lever adjacent the saws becomes worn at its joints, the leverage becomes unreliable, and the adjustment and locking of the saws becomes inaccurate and inefficient. This inefficiency and inaccuracy becomes greater in proportion to the length of the lever arm adjacent the saw guide, and thereby a condition results that causes waste in lumber and a departure from the standard sizes of lumber to be cut.

In carrying out my invention I do not place reliance on the levers for securing the final adjustment, nor for locking the adjusted saws. The levers are employed for securing the approximate adjustment of the saws, after which the saws are automatically adjusted to their final precise adjustment and then automatically locked in their final adjustment. Thus, no loss of efficiency can occur in the adjustment due to wear of jointed parts, and no loss of efficiency nor rigidity can occur in the locking device for the saw for the reason that friction in the locking operation is practically eliminated. As a result of these conditions a durable adjusting device and a durable locking device are provided for each saw, frequent replacement of parts is eliminated, and a maximum use of the saw mill is attained.

My invention contemplates the employment of a rotary or partially rotatable rack-bar that is equipped with combined adjusting and locking teeth which are spaced apart to form notches corresponding to a predetermined scale of dimensions for standard cuts in the lumber, and the saw guides on which are mounted locking teeth for co-action with the rack bar, may be shifted from a remote distance to an approximate adjustment, after which the final precise adjustment is automatically effected and the locking of the saws is also automatically accomplished.

This invention is a division of the subject matter involved in my co-pending application for patent Serial Number 533,625 filed April 29, 1931, Patent No. 1,921,569 and this present application involves certain combinations and arrangements of parts for manually and approximately adjusting the saws; for automatically securing the final and precise adjustment of the saws; and for automatically locking the finally adjusted saws. In its specific embodiment, the invention contemplates the use of the rotary rack-bar in combination with the lever-mechanism of the saw mill, all as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention, and it will be understood that changes and alterations may be made in the exemplified structure, within the scope of my claim, without departing from the principles of my invention.

Figure 1 is a side view of an edger equipped with the adjusting and locking mechanism.

Figure 2 is a plan view of the edger of Figure 1, looking down at line 2—2 in Figure 1, showing the rotary saws in a gang of seven, with the front feed rolls being broken away for convenience of illustration, and showing the relative arrangement of the shafting levers.

Figures 3 and 4 are plan view of two well known shifting levers, in different positions, and Figure 5 is an edge view of one of the levers with a guide mounted on one end thereof.

Figure 6 is a vertical, transverse sectional view looking toward the front end of the machine, showing duplex adjusting and locking devices for two sets of seven rotary saws, some of the saw guides being omitted for convenience of illustration; the rotary rack bar at the left of the drawing being raised to locking position, while the rotary rack bar at the right side of the drawing is lowered to inactive position.

Figure 7 is a transverse sectional view, enlarged, of one of the rack bars, showing one of the teeth in lowered or inactive position. Figure 8 is a view looking from the left at the portion of the rack bar in Figure 7. Figure 9 shows a portion of the rack bar and two of the locking teeth in locking position.

Figure 10 is a sectional view at line 10—10 of Figure 6, and enlarged, showing the rack bar in locking position.

Figure 11 is a perspective view of one of the teeth (detached) that is mounted at the end of each shifting lever for use with a pair of teeth, as indicated in Figure 9.

In order that the general arrangement and utility of the parts may readily be understood I have illustrated in Figures 1 and 2 a gang of seven rotary saws S that are shiftable laterally on the arbor A, which arbor is provided with the usual driving pulley P, and the shaft or arbor is journaled in bearings B of the frame F. The lumber is fed longitudinally through the machine by the fluted rolls R, and the pipe rolls or press rolls Q mounted above the table T, the side boards for the lumber being omitted, and two of the feed rolls being broken away for convenience of illustration.

Each saw is provided with a guide G, and each guide is mounted on the end of a shifting lever L that extends a considerable distance from the saw end of the machine to the front end of the machine where the edgerman is stationed, and the levers are manipulated by the edgerman for a "rough" or preliminary, or approximate adjustment of the saws, after which the saws are automatically given a precise and final adjustment and then automatically and mechanically locked in finally adjusted position.

Each lever L is pivoted at 1 on the table T, and is provided with an auxiliary lever arm 2, centrally pivoted at 3 on the main lever, and the latter, at its saw end, rests upon the frame F', while its front free end rests upon a cross bar 4, a number of these supporting bars being shown in Figure 2.

At the saw end of the lever L, the auxiliary lever arm 2 is pivoted at 5 to a horizontal arm 6 of the upright guide carrier or post 7, and the arm 6 is pivoted at 8 on the end of the main lever L. At the front end of the auxiliary lever arm a pivotal connection is made at 9 in the stationary racket 10 which is secured to the frame of the table T. The seven shifting levers L are disposed in usual position, longitudinally of the table, and they are manipulated by the edgerman in customary manner for shifting the respective saws of the gang.

The guide G in each case is pivotally mounted at 11 in the top of the guide carrier, in order that the guide may be turned to upright position if and when necessary to gain access to the saw.

The free end of the guide G is bifurcated to form jaws and each jaw is equipped with a guide pin as 12, fashioned from lignum vitæ or other suitable material, for contact with the opposite sides of the saw to shift the latter on its arbor A. The split jaws as seen in Figure 10 are clamped at 13 to secure the guide pins in place, and to readily permit releasing of the pins when replacement or adjustment is necessary.

At the lower end of each upright carrier is mounted a downwardly projecting tooth 14 which is fashioned with attaching flanges 15 that are fitted up on the lower end of the carrier and securely fastened thereto at 16, as best seen in Figures 10 and 11.

These teeth, as shown are wedge shaped, and after the saw has been adjusted to approximate position by the edgerman in his manipulation of the lever L, the teeth 14 co-act with other teeth in the final adjustment of the saws and in the locking of the saws. By manipulation of the lever L the edgerman shifts the guide carrier, guide, and saw to approximate position, and then the saws are automatically adjusted in precise position and automatically locked in the precise adjusted position. The teeth 14 are located directly above and for co-action with a rotary rack bar 17, two of which are shown in Figure 6, and journaled in bearings D. The rack bars are provided with teeth 18 of arcuate shape, spaced apart at standard distances to form notches for the teeth 14, and the arcuate teeth are fashioned with wedge shaped points 19 for co-action with the wedge points 14' of the teeth 14 in automatically adjusting the tooth 14 and saw as described. Thus, as indicated in Figure 10 the rack bar is rotated or partially rotated to bring its teeth on the upper side of the bar, and as the bar is turned the wedges 19 of the teeth come into frictional contact with the wedges 14' for the purpose of guiding the tooth or teeth 14 to register with complementary notches between two adjoining teeth 18, and in this manner the saws are automatically adjusted in precise position. Then the continued turning or rocking movement of the rack bar brings the teeth 18 into position at opposite sides of the teeth 14, the latter occupying the notch between a pair of adjoining teeth 18, and as the teeth 14 fit neatly or closely in the walls of the notch, the tooth 14 is rigidly held against movement, and thereby the saw and its guide are held in rigid position. As thus held the saws are prevented from drifting, which is sometimes caused by the grain in the wood as it exerts a tendency to move the saw if there is a looseness in its locking mechanism, and because of the rigid locking device of my invention the lumber is cut accurately according to the standard of dimensions set by the spacing of the teeth on the rack bar.

It will be apparent that as the rack bar is turned to locking position, the co-action of the wedge points 14' and 19 on the respective teeth will result in centering the partially or roughly adjusted guides and their saws with the teeth 14 exactly in line with the notches of the rack bar. The sliding contact of the wedges 14' and 19 tend to clear the parts against accumulation of sawdust and other débris, and therefore when the rack bar is turned to position of the showing in Figure 9, the full width of the tooth 14 snugly and closely fits against the side walls of the notch in the rack bar, to hold the tooth 14 against lateral movement.

The power for turning or rocking the rack bars is supplied from a suitable source, as an airmotor 20, one of which is used (but not shown) at each side of machine as in Figure 6. These motors are operated, under control of the edgerman, as indicated in my above mentioned co-pending application for patent.

Each of the rack bars has a crank arm 21 that is rotatable therewith, and the reciprocable stem 22 of the air-motor is pivotally connected, as by the pin and slot connection 23 and 24, to convert the reciprocating movement of the stem into a swinging movement of the crank arm and the consequent turning or rocking movement of the rack bar. The air pressure of the motor holds the rack bar in active or operative position, and pressure in an opposite direction moves the stem 22 thereby swinging the locking teeth 18 to dotted position in Figure 10, thereby releasing the guide teeth 14 of the lever devices.

This automatic setting or adjusting of the saw guide and then the automatic locking of the guide are accomplished after the edgerman has, by the use of the lever L, brought the saw guide into approximately correct adjustment, and the automatic adjustment and locking of the guide relieves the edgerman of the expenditure of time and labor required for that purpose. The automatic and independent locking of the guide by the rack bar, apart from the lever mechanism and apart from any jointed parts that will wear, insure a close fit at all times between the teeth 14 and 18 and consequently a rigid lock for the saw guide, against lateral movement.

In some mill operations the extension levers L and the table in front of the edgers are eliminated and in their stead a short or stub lever is used. The adjusting and locking devices above set forth pertain as well to this latter type, for, while there are not so many joints the side strain on the saws is much greater due, in part, to the heavier material handled in the edger, and a positive lock for the saws is of importance.

Having thus fully described my invention, what I claim as new and desire to secure by Letters Patent is:—

In an adjusting and rocking mechanism for a laterally movable saw, the combination with a pivoted, manually operated shifting-lever, a carrier mounted on the short arm of the lever, and a guide on the carrier whereby approximate adjustment of the guide and saw are attained, of a wedge shaped tooth mounted on the carrier, a rotary rack bar adjacent to the tooth, said rack bar having a notch and opposed beveled walls for the notch, and means for operating the rotary rack bar for engaging said walls with said tooth whereby the guide and saw are precisely adjusted and locked in adjusted position.

FRED W. HORSTKOTTE.